(12) United States Patent
Kuno et al.

(10) Patent No.: US 12,343,970 B2
(45) Date of Patent: Jul. 1, 2025

(54) SHEET PROCESSING DEVICE, SHEET OUTPUT DEVICE, LAMINATOR, IMAGE FORMING APPARATUS, AND IMAGE FORMING SYSTEM

(71) Applicants: Satoshi Kuno, Tokyo (JP); Akira Kunieda, Tokyo (JP); Yohsuke Haraguchi, Kanagawa (JP); Hirofumi Horita, Kanagawa (JP); Koju Kawakami, Tokyo (JP); Yasunobu Kidoura, Kanagawa (JP); Ryohsuke Akaishi, Kanagawa (JP)

(72) Inventors: Satoshi Kuno, Tokyo (JP); Akira Kunieda, Tokyo (JP); Yohsuke Haraguchi, Kanagawa (JP); Hirofumi Horita, Kanagawa (JP); Koju Kawakami, Tokyo (JP); Yasunobu Kidoura, Kanagawa (JP); Ryohsuke Akaishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 18/155,270

(22) Filed: Jan. 17, 2023

(65) Prior Publication Data

US 2023/0264461 A1    Aug. 24, 2023

(30) Foreign Application Priority Data

Feb. 18, 2022    (JP) ................................ 2022-023963

(51) Int. Cl.
   *B65H 31/24*    (2006.01)
   *B32B 37/00*    (2006.01)
   *B65H 1/04*    (2006.01)

(52) U.S. Cl.
   CPC ........... *B32B 37/0053* (2013.01); *B65H 1/04* (2013.01); *B65H 31/24* (2013.01);
   (Continued)

(58) Field of Classification Search
   CPC ........ B32B 37/0053; B32B 2037/0069; B65H 1/04; B65H 31/24; B65H 2801/27
   See application file for complete search history.

(56) References Cited

U.S. PATENT DOCUMENTS

| | | | |
|---|---|---|---|
| 5,207,417 A * | 5/1993 | Bell | B65H 29/40 |
| | | | 271/220 |
| 6,446,958 B1 * | 9/2002 | Sette | B65H 29/60 |
| | | | 271/902 |

(Continued)

FOREIGN PATENT DOCUMENTS

| | | | |
|---|---|---|---|
| EP | 659668 A2 * | 6/1995 | ........... G03G 15/234 |
| JP | 2-95666 * | 4/1990 | |

(Continued)

*Primary Examiner* — Thomas A Morrison
(74) *Attorney, Agent, or Firm* — Harness, Dickey & Pierce, P.L.C.

(57) ABSTRACT

A sheet processing device includes a sheet storage and a sheet displacer. The sheet storage includes a first storage portion that includes a first wall that is one side wall of the sheet storage and a second wall that is part of another side wall of the sheet storage and a second storage portion that includes a third wall continuous to the first wall and the second wall. The sheet displacer displaces a preceding sheet stored in the sheet storage and contacts an upper end of the preceding sheet to displace the preceding sheet such that the upper end of the preceding sheet moves toward the third wall. The second wall and the third wall are coupled via a bent portion that bends in a manner such that a storage space of the second storage portion is greater than a storage space of the first storage portion.

15 Claims, 7 Drawing Sheets

(52) U.S. Cl.
CPC ................ *B32B 2037/0061* (2013.01); *B32B 2037/0069* (2013.01); *B65H 2801/27* (2013.01)

(56) References Cited

U.S. PATENT DOCUMENTS

| | | | |
|---|---|---|---|
| 2007/0102861 A1* | 5/2007 | Shida | B65H 31/00 270/59 |
| 2021/0289090 A1 | 9/2021 | Monma et al. | |
| 2022/0291620 A1 | 9/2022 | Fujita et al. | |

FOREIGN PATENT DOCUMENTS

| | | | |
|---|---|---|---|
| JP | 4-2925 | * | 1/1992 |
| JP | 2010-070337 | | 4/2010 |
| JP | 2018-203478 | | 12/2018 |
| JP | 2021-143072 | | 9/2021 |

* cited by examiner

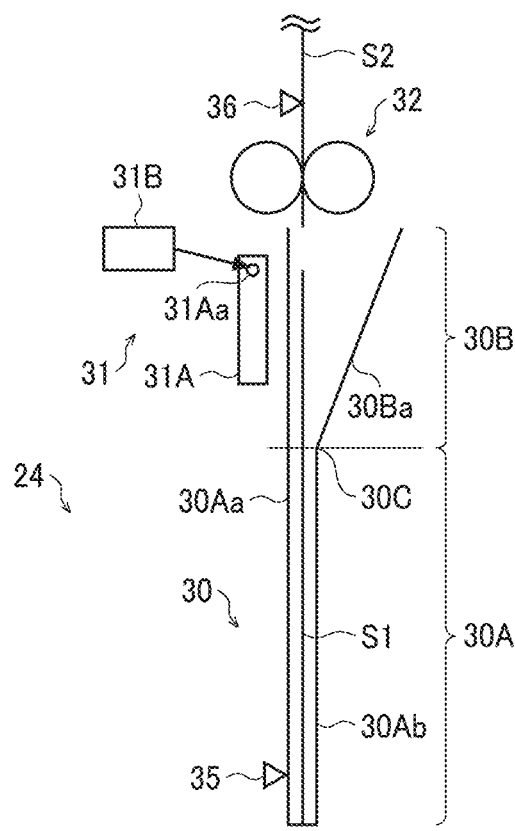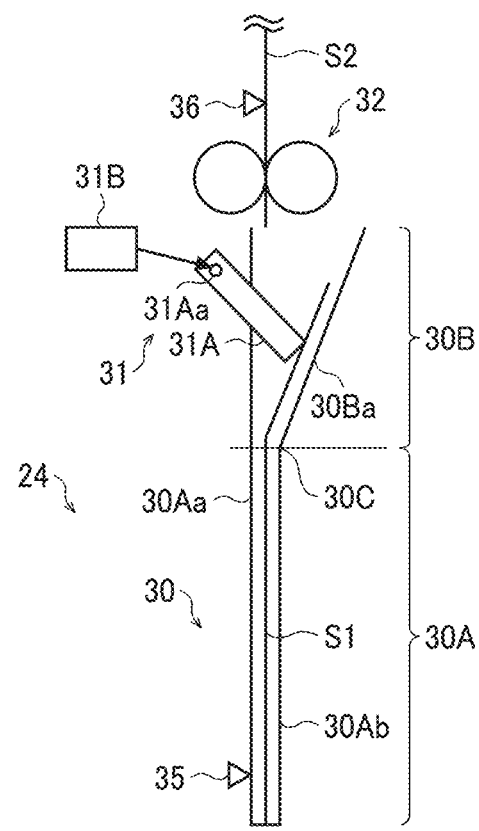

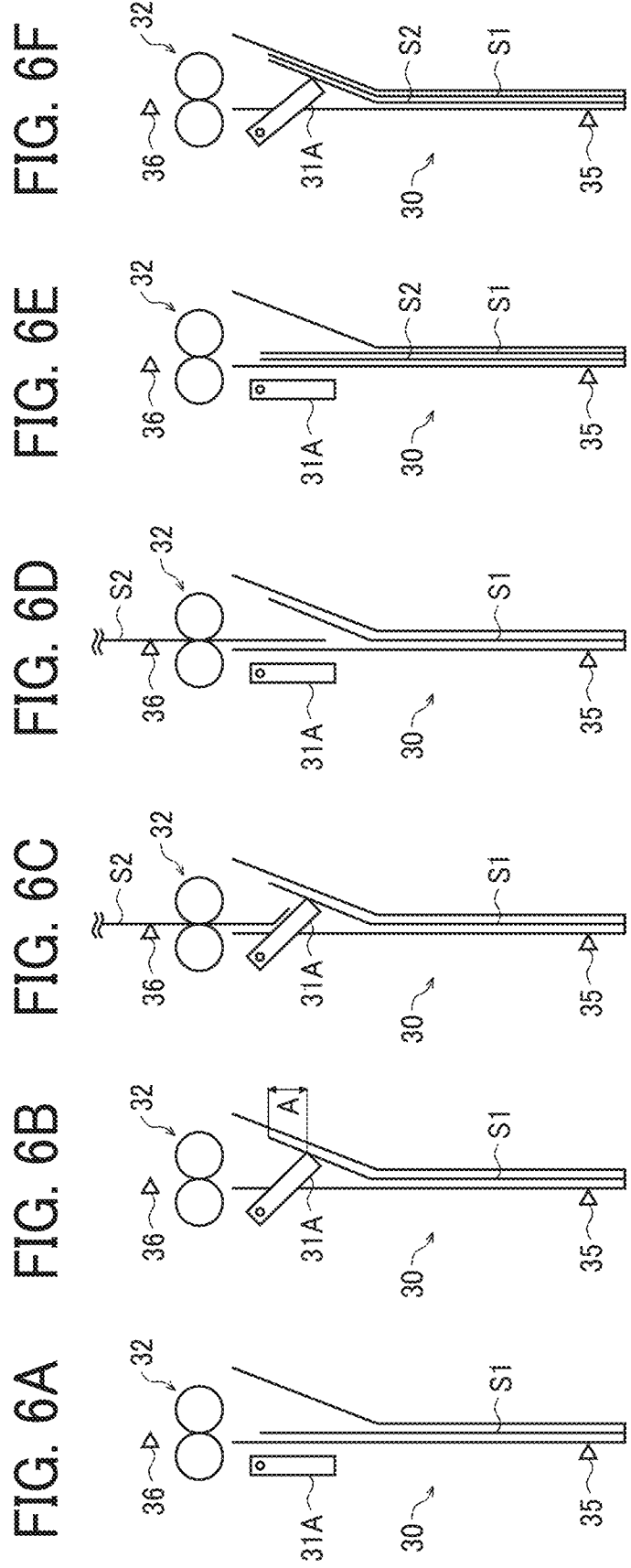

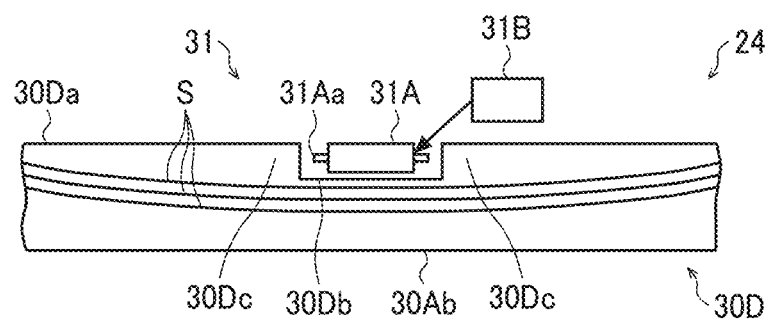
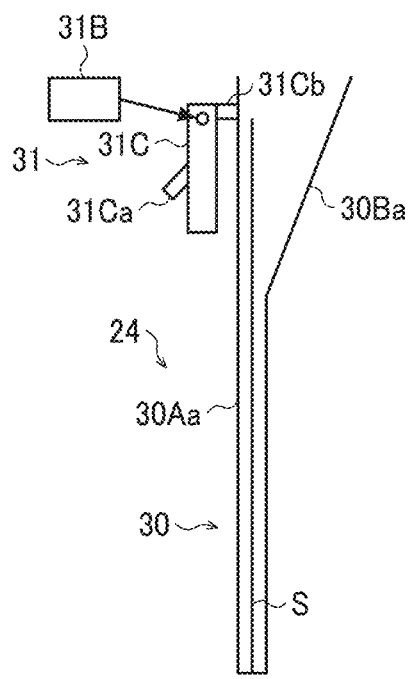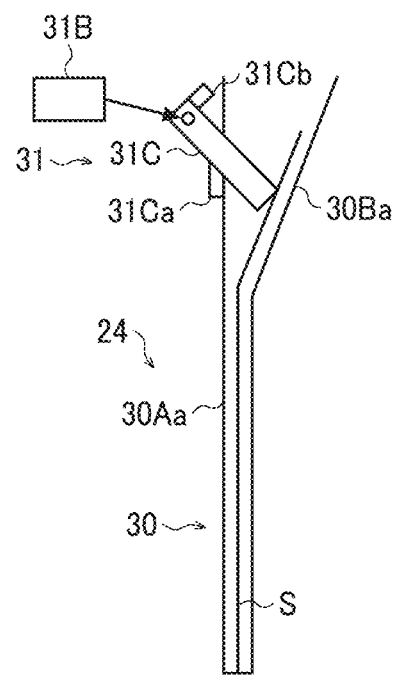

SHEET PROCESSING DEVICE, SHEET OUTPUT DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-023963, filed on Feb. 18, 2022, in the Japan Patent Office, the entire disclosure of which is hereby incorporated by reference herein.

BACKGROUND

Technical Field

Embodiments of the present disclosure relate to a sheet processing device, a sheet output device, a laminator, an image forming apparatus, and an image forming system.

Related Art

In the related art, a sheet processing device is known that can stably stack sheets ejected from an apparatus body. In the related art, a configuration is also known in which a sheet ejector that includes such a sheet processing device is disposed in an image forming apparatus that includes a recording device. Since sheets as recording media are horizontally placed and stacked in a sheet processing device in the related art, the area occupied by the image forming apparatus may increase. For this reason, various sheet processing devices that can vertically store a large number of sheets have been proposed in order to reduce the area occupied by the apparatus body of, for example, an image forming apparatus.

SUMMARY

In an embodiment of the present disclosure, there is provided a sheet processing device that includes a sheet storage and a sheet displacer. The sheet storage includes a first storage portion that includes a first wall that is one side wall of the sheet storage and a second wall that is part of another side wall of the sheet storage and a second storage portion that includes a third wall continuous to the first wall and the second wall upstream from the first storage portion in the conveyance direction of the sheet. The sheet displacer displaces a preceding sheet stored in the sheet storage and contacts an upper end of the preceding sheet to displace the preceding sheet such that the upper end of the preceding sheet moves toward the third wall. The second wall and the third wall are coupled via a bent portion that bends in a manner such that a storage space of the second storage portion is greater than a storage space of the first storage portion.

In another embodiment of the present disclosure, there is provided a sheet output device that includes the sheet processing device and an output tray.

In still another embodiment of the present disclosure, there is provided a laminator that includes the sheet processing device.

In still yet another embodiment of the present disclosure, there is provided an image forming apparatus that includes any one of the sheet processing device, the sheet output device, or the laminator.

In still yet further another embodiment of the present disclosure, there is provided an image forming system that includes the sheet processing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A and 5B are schematic views of a sheet processing device used in the first embodiment of the present disclosure;

FIGS. 6A to 6F are diagrams illustrating a series of sheet storing operations in the sheet processing device used in the first embodiment of the present disclosure;

FIG. 7 is a plan view of a sheet storage used in a second embodiment of the present disclosure when viewed from an upstream side in a sheet conveyance direction;

FIGS. 8A and 8B are schematic views of a sheet displacing member used in a third embodiment of the present disclosure;

Figure 1:
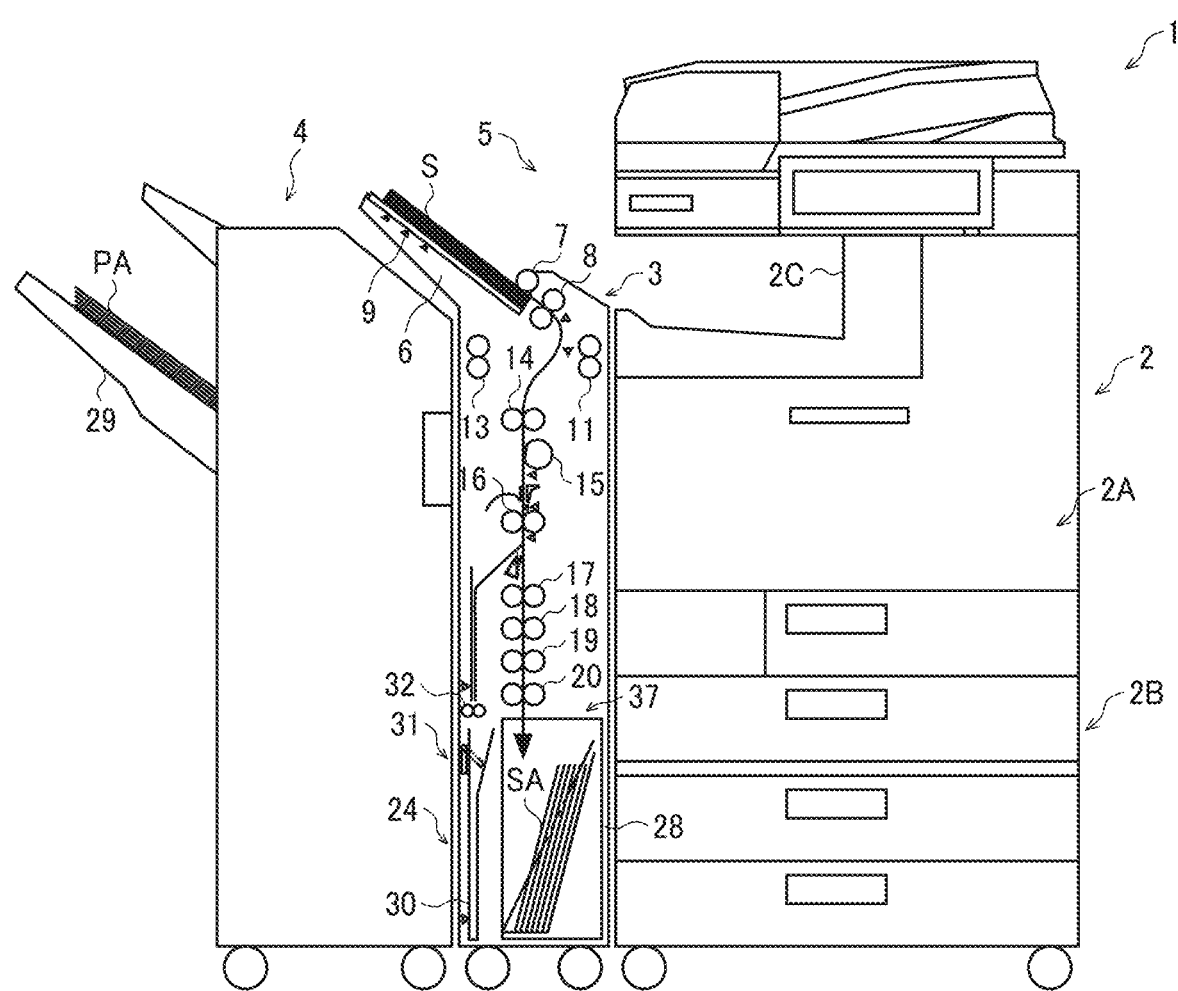
FIG. 1 is a front view of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic view of an image forming system 1 according to a first embodiment of the present disclosure. The image forming system 1 includes a multifunction peripheral 2 having, i.e., a copy function, a print function, or a facsimile function, a laminator 3, and a post-processing apparatus 4. Among these components, the multifunction peripheral 2 alone can constitute an image forming apparatus. As illustrated in FIG. 1, a configuration including the multifunction peripheral 2 and the laminator 3 can also constitute an image forming apparatus 5.

The multifunction peripheral 2 includes an image forming device 2A and a sheet feeder 2B. The image forming device 2A forms an image on a transfer sheet as a recording medium. The sheet feeder 2B stores transfer sheets on which images are to be formed and feeds the transfer sheets to the image forming device 2A. The transfer sheets stored in the sheet feeder 2B and used for image formation also include inner sheets used when laminate processing is performed in the laminator 3 and sealed between lamination sheets. The transfer sheet on which an image has been formed in the multifunction peripheral 2 is ejected onto a relay device 2C that also serves as an output tray. The transfer sheet ejected onto the relay device 2C can be fed to the laminator 3 in that state. Accordingly, since image formation can be performed on the inner sheet by the multifunction peripheral 2, the image forming apparatus 5 can automatically perform a series of processes including feeding of the lamination sheet, separation, inner sheet preparation, inner sheet insertion, and laminating. A description of the post-processing apparatus 4 is given below.

Figure 2:
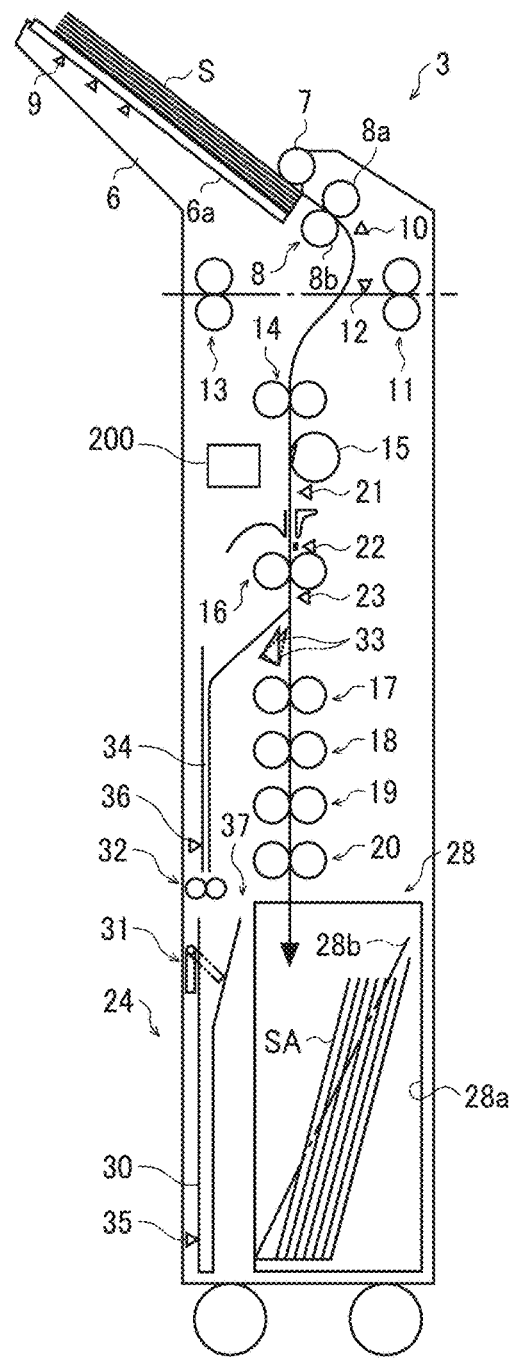
FIG. 2 is a schematic view of a laminator according to the first embodiment of the present disclosure.

The laminator 3 illustrated in FIGS. 1 and 2 is an apparatus that performs the laminate processing in which an inner sheet (i.e., paper or photograph) is inserted into a lamination sheet serving as a two-ply sheet in which two stacked sheets are joined at only one side, applies heat and pressure, and joins the lamination sheet holding the inner sheet. In the following description, the expression of "joining the lamination sheet and the inner sheet" is used. Examples of a lamination sheet S used as a sheet include a sheet in which one side is permeable such as a polyester sheet and the other side is permeable or impermeable, and a lamination film. Examples of the inner sheet include plain paper, thick paper, postcards, envelopes, thin paper, coated paper, tracing paper, and overhead projector (OHP) transparencies.

The laminator 3 includes a sheet feed tray 6 on which the lamination sheets S are stacked, a sheet feed roller 7 that feeds the lamination sheets S on the sheet feed tray 6, and a separation roller pair 8 that separates the lamination sheets S fed by the sheet feed roller 7 one by one. The sheet feed tray 6 is provided with a plurality of sheet size detection sensors 9 that detect the size of the stacked lamination sheets S. The sheet feed tray 6 includes a sheet tray 6a as a liftable sheet stacking portion on which the lamination sheets S are stacked. The sheet tray 6a is lifted and lowered by lifting and lowering members so that the uppermost lamination sheet S is pressed against the sheet feed roller 7 with a specified pressing force. The separation roller pair 8 includes a feed roller 8a that is driven to rotate in conjunction with the sheet feed roller 7 and a separate roller 8b that is stopped or rotatable in a direction opposite to a sheet feed direction (see FIG. 2). Both the rollers 8a and 8b have high frictional resistance members on their surfaces. When two or more lamination sheets S are fed, only one sheet is fed due to the difference between frictional resistance between the sheets and frictional resistance between the sheet and the rollers.

A sheet conveyance detection sensor 10 that detects conveyance of the lamination sheet S is disposed downstream from the separation roller pair 8 in the sheet conveyance direction. The sheet conveyance detection sensor 10 detects whether the lamination sheet S is being conveyed, and also detects when two or more lamination sheets S are conveyed, that is, when multiple feeding occurs. An entrance roller pair 11 that receives a transfer sheet sent from the multifunction peripheral 2 and a sheet conveyance detection sensor 12 that detects the conveyed transfer sheet are disposed below the sheet conveyance detection sensor 10. An ejection roller pair 13 that sends out the transfer sheet sent from the multifunction peripheral 2 to the post-processing apparatus 4 is disposed on the left side of the entrance roller pair 11 when the laminate processing is not performed in the laminator 3.

A first conveying roller pair 14, a winding roller 15, a second conveying roller pair 16, a third conveying roller pair 17, a heating roller pair 18, a fourth conveying roller pair 19, or an ejection roller pair 20 are disposed downstream from the separation roller pair 8 in the sheet conveyance direction. A sheet position detection sensor 21 that detects the positions of the lamination sheet S and an inner sheet P as the transfer sheet is disposed downstream from the winding roller 15 in the sheet conveyance direction. A sheet condition detection sensor 22 that detects the condition of the lamination sheet S is disposed downstream from the sheet position detection sensor 21 in the sheet conveyance direction. A sheet position detection sensor 23 that detects the positions of the lamination sheet S and the inner sheet P is disposed downstream from the second conveying roller pair 16 in the sheet conveyance direction.

In FIGS. 1 and 2, each of the first conveying roller pair 14 and the second conveying roller pair 16 includes a drive roller and a driven roller which are pressed against each other. The drive roller is driven to rotate by a driver to nip and convey the lamination sheet S and the inner sheet P. The first conveying roller pair 14 is rotatable only in the conveyance direction in which the sheet is fed downward in FIG. 2. The second conveying roller pair 16 is rotatable in both the conveyance direction and a reverse conveyance direction opposite to the conveyance direction.

Figure 3:
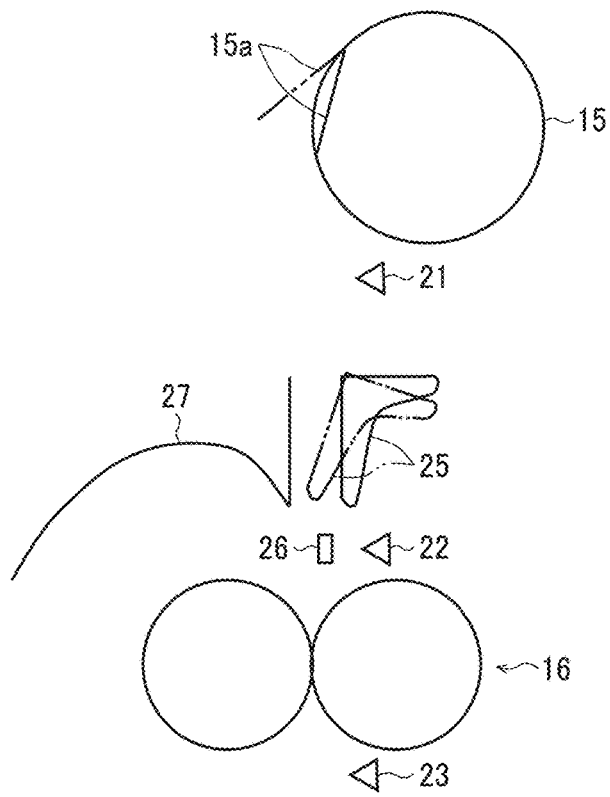
FIG. 3 is a schematic view of a winding roller, a switching claw, and a separation claw used in the laminator.

As illustrated in FIG. 3, for example, the winding roller 15, a switching claw 25, and a separation claw 26 are disposed between the first conveying roller pair 14 and the second conveying roller pair 16. The winding roller 15 is driven to rotate by a driver and is rotatable in both the conveyance direction and the reverse conveyance direction similarly to the second conveying roller pair 16. The winding roller 15 has a gripper 15a that holds the lamination sheet S on its outer circumferential surface. The gripper 15a is displaced by an opening and closing member to selectively occupy a closed position indicated by a solid line and an open position indicated by a long dashed double-dotted line in FIG. 3. An end of the lamination sheet S can be gripped at the closed position. The gripped end of the lamination sheet S is released at the open position. When the end of the lamination sheet S is gripped by the gripper 15a, the end position of the lamination sheet S is detected by the sheet position detection sensor 21.

The switching claw 25 is disposed downstream from the sheet position detection sensor 21 in the sheet conveyance direction. The switching claw 25 is displaced by a displacer and selectively occupies a first position indicated by a solid line and a second position indicated by a long dashed double-dotted line in FIG. 3. When the switching claw 25 occupies the first position, the leading end of the lamination sheet S conveyed between the winding roller 15 and the second conveying roller pair 16 can pass in any of the conveyance direction and the reverse conveyance direction. When the switching claw 25 occupies the second position, the leading end of the lamination sheet S in the conveyance direction (i.e., the leading end placed upstream from the switching claw 25 in the conveyance direction) passes through the switching claw 25 and can be conveyed downstream from the switching claw 25. When the switching claw 25 occupies the second position, the leading end of the lamination sheet S in the reverse conveyance direction (i.e., the leading end placed downstream from the switching claw 25 in the conveyance direction) is prevented from passing through the leading end of the switching claw 25 and from moving toward the upstream side in the conveyance direction. At this time, the leading end of the lamination sheet S in the reverse conveyance direction is separated into two sheets by the separation claw 26. One of the two sheets is guided by the switching claw 25 and conveyed to the right side in FIG. 3. The other leading end of the separated lamination sheet S in the reverse conveyance direction is guided by a guide plate 27 fixed to a body of the laminator 3 and conveyed to the left side in FIG. 3.

A pair of separation claws 26 are disposed downstream from the switching claw 25 in the sheet conveyance direction, to be movable in the width direction of the lamination sheet S. The separation claw 26 is selectively positioned at a standby position and a separation position by a mover. The separation claws 26 have pointed leading ends that are inner ends opposed to each other, and are formed so that each leading end can be inserted between overlaid sheets of the lamination sheet S when the separation claw 26 occupies the separation position. When the separation claw 26 occupies the standby position, each leading end is retreated to the outside of the conveyance region of the lamination sheet S. Thus, the separation claw 26 does not disturb the conveyance of the lamination sheet S. The sheet condition detection sensor 22 is disposed at a position corresponding to the leading end of the lamination sheet S, into which the separation claws 26 are inserted, in the conveyance direction.

In FIGS. 1 and 2, each of the third conveying roller pair 17, the fourth conveying roller pair 19, and the ejection roller pair 20 includes a drive roller and a driven roller that are pressed against each other. Thus, the drive roller is driven to rotate by a driver to nip and convey the lamination sheet S. Each of the third conveying roller pair 17, the fourth conveying roller pair 19, and the ejection roller pair 20 is rotatable only in the conveyance direction. The heating roller pair 18 includes a heating roller that has a heater therein and is driven to rotate and a pressure roller that is pressed against the heating roller and is driven to rotate. The heating roller pair 18 applies heat and pressure to the lamination sheet S, in which the inner sheet P is inserted between the two sheets, to join the lamination sheet S with the inner sheet P.

An output tray 28 that stores a finished-product lamination sheet SA joined and finished after the insertion of the inner sheet P is disposed downstream from the ejection roller pair 20 in the sheet conveyance direction. The output tray 28 stores the finished-product lamination sheet SA, which is vertically conveyed downward in the body of the laminator 3, in vertical state. The output tray 28 has an opening portion 28a serving as an open portion on the front face of the body, so that the stored finished-product lamination sheet SA can be easily taken out. As the open portion, an openable door or the like may be provided. In the body of the laminator 3 provided with the output tray 28, a plate-shaped member 28b defining the left wall surface of the opening portion 28a is displaceable toward the opening portion 28a as indicated by a long dashed double-dotted line in FIG. 2. As a result, the inner space of the body of the laminator 3 on the left side of the output tray 28 in FIG. 2 is opened.

A sheet processing device 24, which is a characteristic part of the present embodiment, is disposed on the left side of the output tray 28. The sheet processing device 24 includes a sheet storage 30 and a sheet displacer 31. The sheet processing device 24 stores, in the sheet storage 30, the lamination sheet S fed from a fifth conveying roller pair 32 disposed above the sheet processing device 24. The sheet processing device 24 is described below. A sheet output device 37 includes the sheet processing device 24 and the output tray 28. A switching claw 33 and a branching passage 34 are disposed between the second conveying roller pair 16 and the third conveying roller pair 17. The switching claw 33 selectively occupies the first position indicated by a solid line and the second position indicated by a long dashed double-dotted line in FIG. 2 by a displacer. When the switching claw 33 occupies the first position, the lamination sheet S conveyed from the second conveying roller pair 16 is conveyed toward the third conveying roller pair 17. When the switching claw 33 occupies the second position, the lamination sheet S conveyed from the second conveying roller pair 16 is conveyed toward the branching passage 34.

Next, a description is given of a series of operations performed in the laminator 3, with reference to FIG. 4. The series of operations performed in the laminator 3 indicates the operations of separating the lamination sheet S, inserting the inner sheet P into the lamination sheet S, and joining the lamination sheet S and the inner sheet P. The configurations of the winding roller 15, the switching claw 25, and the separation claw 26 described above and the operation described below are disclosed in detail in a technology by the same applicant of the present disclosure, for example, Japanese Patent Application Publication No. 2021-143072 or its corresponding U.S. Patent Application Publication No. 2021-0289090, which is hereby incorporated by reference as though disclosed herein in its entirety. As illustrated in FIG. 2, the lamination sheets S on the sheet feed tray 6 are set such that one side having a joined portion where two sheets are joined is positioned downstream from the sheet feed tray 6 in the sheet conveyance direction. Thus, a plurality of lamination sheets S are stacked on the sheet feed tray 6. When the setting of the lamination sheet S is confirmed and a start key is turned on, the laminator 3 operates the sheet feed roller 7 and the separation roller pair 8 to feed one lamination sheet S toward the first conveying roller pair 14.

Figure 4A:
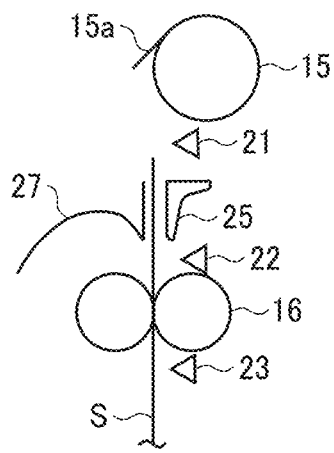
FIGS. 4A to 4H are diagrams illustrating a series of steps for a lamination sheet in the laminator.

The first conveying roller pair 14, which has received the lamination sheet S from the separation roller pair 8, conveys the lamination sheet S further downstream from the first conveying roller pair 14. The leading end of the conveyed lamination sheet S in the conveyance direction is one side having a joined portion where two sheets are joined. The trailing end in the conveyance direction is the other side having an overlaid portion where two sheets are overlaid. The laminator 3 temporarily stops the conveyance of the lamination sheet S at the time when the trailing end of the lamination sheet S in the conveyance direction passes through the winding roller 15 and the detection of the lamination sheet S by the sheet position detection sensor 21 is lost. Thereafter, the laminator 3 operates the opening and closing member to displace the gripper 15a from the closed position to the open position as illustrated in FIG. 4A.

Figure 4B:
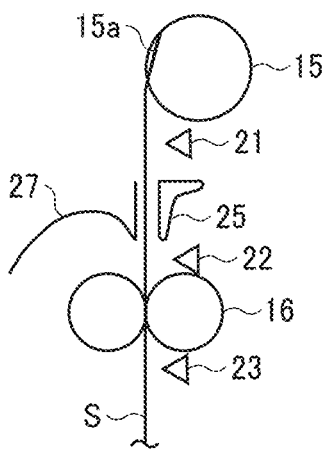

Next, the laminator 3 rotates the second conveying roller pair 16 in reverse to convey the lamination sheet S in reverse vertically upward. When the laminator 3 recognizes, based on a signal from the sheet position detection sensor 21, that the trailing end (leading end in the reverse conveyance direction) of the lamination sheet S conveyed in reverse has been conveyed to a position where the trailing end can be gripped by the gripper 15a occupying the open position, the reverse conveyance of the lamination sheet S is stopped. Thereafter, the laminator 3 operates the opening and closing member to displace the gripper 15a from the open position to the closed position as illustrated in FIG. 4B. Thus, the laminator 3 holds the lamination sheet S on the outer circumferential surface of the winding roller 15.

Figure 4C:
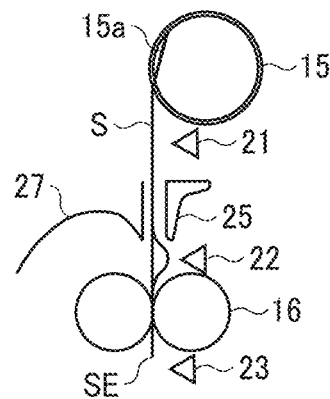

Next, the laminator 3 drives to rotate the winding roller 15 in a clockwise direction in FIG. 3 and winds the lamination sheet S on an outer circumferential surface of the winding roller 15. When the lamination sheet S is wound around the outer circumferential surface of the winding roller 15 by about one turn, the sheet positioned on the inner side of the lamination sheet S is left over against the sheet positioned on the outer side of the lamination sheet S due to a difference in circumferential length when the two overlaid sheets are wound. Thus, a slack is generated in a joined portion that is one side of the lamination sheet S. As a result, a space is generated between the sheets as illustrated in FIG. 4C. The generated space is detected by the sheet condition detection sensor 22. A conveyance control of the lamination sheet S in a case where the lamination sheet S is wound around the winding roller is performed based on the signal from the sheet position detection sensor 23. In a state illustrated in FIG. 4C, the one side SE of the lamination sheet S on which the joined portion is disposed is placed downstream from the sheet position detection sensor 23 in the reverse conveyance direction.

Figure 4D:
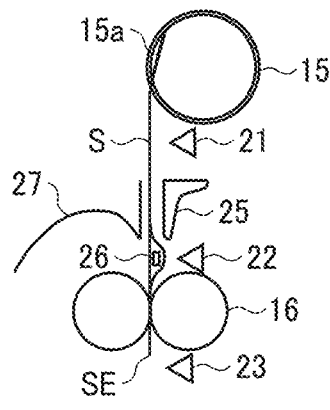
Figure 4E:
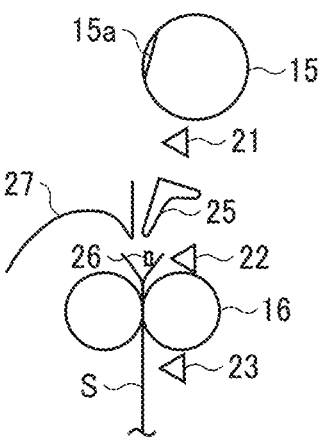
Figure 4F:
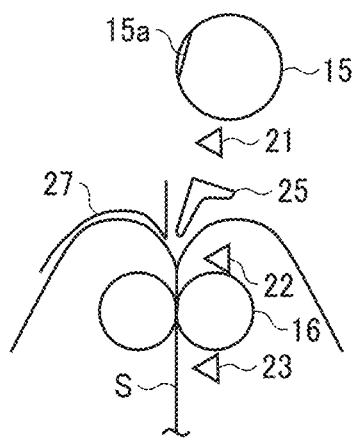
Figure 4G:
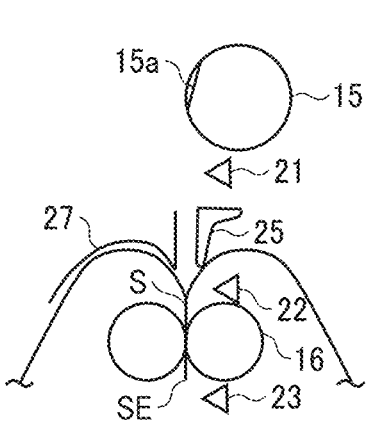
Figure 4H:
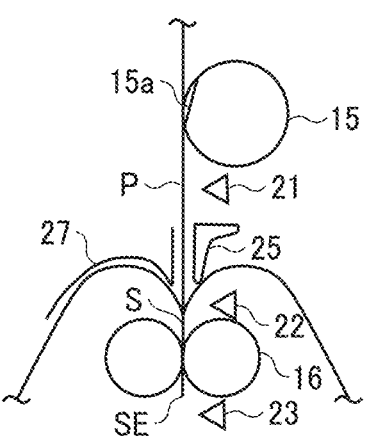

Next, the laminator 3 operates the mover to move the separation claws 26 from the standby position to the separation position, inserts the separation claws 26 into the space generated between the sheets from both sides in the width direction of the lamination sheet S, and reliably maintains the generated space by the separation claws 26 as illustrated in FIG. 4D. Thereafter, the winding roller 15 is rotated in the counterclockwise direction in FIG. 3 in a state where the separation claws 26 are inserted between the sheets. The second conveying roller pair 16 is rotated in the normal direction to move the space in which the sheets are separated to the trailing end of the lamination sheet S in the conveyance direction. In the middle of the operation, when the lamination sheet S is moved by a specified amount, the gripper 15a is displaced to the open position to release the trailing end in the conveyance direction of the lamination sheet S held by the winding roller 15. Thereafter, when the trailing end of the lamination sheet S in the conveyance direction has reached the position corresponding to the separation claws 26, the conveyance of the lamination sheet S is stopped and the displacer is operated. Thus, the switching claw 25 is displaced from the first position to the second position as illustrated in FIG. 4E.

Next, the laminator 3 rotates the second conveying roller pair 16 in reverse to convey the lamination sheet S in reverse. At this time, one of the two sheets separated from each other by the separation claws 26, which is placed on the right side in FIG. 4E, is guided rightward by the switching claw 25 located at the second position. The other sheet of the two sheets placed on the left side in FIG. 4E is guided leftward by the guide plate 27. During this operation, when the two separated sheets are guided in the left and right directions by the switching claw 25 and the guide plate 27, respectively, the mover is operated to move the separation claws 26 from the separation position to the standby position. Thus, the sheets are brought to the state illustrated in FIG. 4F. When the lamination sheet S is further conveyed in the reverse direction, the two separated sheets are entirely separated from each other. When one side SE of the lamination sheet S has reached a specified position, the reverse conveyance of the lamination sheet S is temporarily stopped. At this time, the joined portion of the lamination sheet S is nipped by the second conveying roller pair 16, and the overlaid portion is largely opened to the left and right. Thereafter, the displacer is operated to displace the switching claw 25 from the second position to the first position. Thus, the sheets are brought to the state illustrated in FIG. 4G.

Next, the inner sheet P as an inner sheet is fed from the multifunction peripheral 2 via the relay device 2C. The fed inner sheet P is taken into the inside of the body of the laminator 3 via the entrance roller pair 11, is detected by the sheet conveyance detection sensor 12, and is guided by a switching claw to be delivered to the first conveying roller pair 14. Thereafter, the inner sheet P is further conveyed downward by the first conveying roller pair 14, and the leading end of the inner sheet P is inserted into the overlaid portion of the lamination sheet S that is widely opened to the left and right. Thus, the sheets are brought to the state illustrated in FIG. 4H. Next, the laminator 3 conveys vertically downward the lamination sheet S into which the inner sheet P is inserted. The sheets are overlaid again to close the opening. The lamination sheet S into which the inner sheet P is inserted is further conveyed downward by the third conveying roller pair 17. Thus, the lamination sheet S is sent to the heating roller pair 18.

The inner sheet P and the lamination sheet S sent to the heating roller pair 18 are cooled when passing through the fourth conveying roller pair 19 and the ejection roller pair 20 after the lamination sheet S and the inner sheet P are joined by the action of heat and pressure. The finished-product lamination sheet SA that has been cooled and completed is ejected to the output tray 28 in an upright state by the ejection roller pair 20. As described above, since the finished-product lamination sheet SA pressed after passing through the heating roller pair 18 is ejected vertically downward, the finished-product lamination sheet SA can be stored in the output tray 28 while being prevented from being curved by an external force. In this configuration, since the finished-product lamination sheet SA is ejected vertically downward, gravity and external force that would deform the finished-product lamination sheet SA do not act on the finished-product lamination sheet SA. Since the finished-product lamination sheet SA is sufficiently cooled before arrival at the output tray 28, deformation of the finished-product lamination sheet SA is reduced even if the stacking surface of the output tray 28 is inclined.

Next, a description is given of the post-processing apparatus 4. In a case of an image forming operation in which the laminate processing is not performed, a transfer sheet PA that is ejected from the multifunction peripheral 2 and is not used as the inner sheet P is received by the entrance roller pair 11 of the laminator 3. Thereafter, the transfer sheet PA is conveyed in the horizontal direction and is conveyed to the post-processing apparatus 4 coupled downstream from the laminator 3 by the ejection roller pair 13. In the post-processing apparatus 4, post processing such as staple processing and sort processing can be performed on the transfer sheet PA. The transfer sheets PA is stacked on an output tray 29 of the post-processing apparatus 4. In the image forming apparatus 5 including the above-described laminator 3, a series of the laminate processing operations including feeding of the lamination sheet S, separation of the lamination sheet S, insertion of the inner sheet P into the lamination sheet S, and joining of the lamination sheet S and the inner sheet P by heating and pressing can be automatically performed. Thus, convenience can be improved as compared with the configuration of the related art.

Here, a description is given of the sheet processing device 24. As illustrated in FIGS. 5A and 5B, the sheet storage 30 included in the sheet processing device 24 includes a first storage 30A in which the leading end (a lower end side in FIGS. 5A and 5B) of the lamination sheet S in the conveyance direction is stored and a second storage 30B in which the trailing end of the lamination sheet S in the conveyance direction is stored. The first storage 30A has a first wall 30Aa that forms one wall of the sheet storage 30 and a second wall 30Ab that forms the other wall of the sheet storage 30. The second storage 30B has the first wall 30Aa and a third wall 30Ba continuous to the second wall 30Ab. The second wall 30Ab and the third wall 30Ba are integrated to be bent and coupled via a bent portion 30C. With this configuration, the second storage 30B is formed such that a storage space of the lamination sheet S is wider than a storage space of the lamination sheet S in the first storage 30A. In the vicinity of the lower end of the first storage 30A, a sheet detection sensor 35 is disposed that detects the lamination sheet S in a case where the lamination sheet S is stored in the sheet storage 30. A sheet leading end detection sensor 36 that detects the leading end of the lamination sheet S to be conveyed is disposed upstream from the fifth conveying roller pair 32 in the sheet conveyance direction.

As illustrated in FIGS. 5A and 5B, the sheet displacer 31 includes a sheet displacing member 31A and a driver 31B. The sheet displacing member 31A is rotatably supported in the body of the laminator 3 by a support shaft 31Aa and selectively occupies a second position illustrated in FIG. 5A and a first position illustrated in FIG. 5B. In the present embodiment, one sheet displacing member 31A is disposed at the center portion in the sheet width direction of the sheet storage 30 and is disposed to be able to protrude into and retract from the space of the second storage 30B via a hole portion disposed in the first wall 30Aa. The driver 31B includes a motor and acts on the support shaft 31Aa to position the sheet displacing member 31A at the first position or the second position.

In the present embodiment, the support shaft 31Aa is disposed on the upper end side of the sheet displacing member 31A in FIGS. 5A and 5B. The support shaft 31Aa may be disposed on the lower end side. In the present embodiment, a configuration is employed in which the sheet displacing member 31A is rotated by the driver 31B that is a motor. However, in some embodiments, a configuration may be employed in which the driver 31B includes a solenoid or a cylinder and the sheet displacing member 31A is linearly moved. Further, in the present embodiment, a configuration is employed in which one sheet displacing member 31A is disposed at the central portion of the sheet storage 30 in the sheet width direction. However, in some embodiments, a configuration may be employed in which two or more sheet displacing members 31A are disposed in the sheet storage 30 in the sheet width direction.

Next, a description is given of the operation of the sheet processing device 24. When a plurality of lamination sheets S to be fed one by one from the sheet feed tray 6 are fed together, the multiple feeding of the lamination sheets S is detected by the sheet conveyance detection sensor 10. At this time, a controller 200 of the laminator 3 conveys the multi-fed lamination sheets S to the sheet processing device 24 to perform the sheet feed processing again, or stops the conveyance of the lamination sheets S. In the above-described separation operation of the lamination sheet S, even when the separation operation of the lamination sheet S fails in the vicinity of the separation claws 26, the lamination sheet S that has failed in separation is conveyed to the sheet processing device 24.

The lamination sheet S conveyed from the second conveying roller pair 16 is guided to the branching passage 34 by the switching claw 33 that occupies the second position in FIG. 2, and is ejected into the sheet storage 30 via the fifth conveying roller pair 32. After the lamination sheet S is stored, the presence of the lamination sheet S is detected by the sheet detection sensor 35, and the information on the detection of the lamination sheet S is displayed on a display unit disposed in the laminator 3 and is notified to a user. This notification operation may be performed at the same time when the lamination sheet S is stored in the sheet storage 30, may be performed after all jobs for the lamination sheet S are completed, or may be performed at the start of the next job. The lamination sheets S that have been normally fed and separated are guided to the third conveying roller pair 17 by the switching claw 33 occupying the first position, heated by the heating roller pair 18, and ejected and stacked in the output tray 28. Since the occurrence rate of multiple feeding or failure in separation is lower than the occurrence rate in the case where feeding or separation is normally performed, the sheet storage amount of the sheet storage 30 is smaller than the sheet storage amount of the output tray 28.

As illustrated in FIG. 5A, when a first lamination sheet S1 that is a preceding sheet is being stored in the sheet storage 30, a second lamination sheet S2 that is a subsequent sheet may be ejected to the sheet storage 30. At this time, when the leading end of the second lamination sheet S2 comes into contact with the trailing end (upper end in FIG. 5A) of the first lamination sheet S1, at least one of the lamination sheets S may be bent to cause a conveyance failure. Thus, a sheet ejection jam may occur. In the configuration of the present embodiment, in order to prevent the occurrence of such a failure, the driver 31B operates to rotate the sheet displacing member 31A around the support shaft 31Aa before the leading end of the second lamination sheet S2 reaches the trailing end of the first lamination sheet S1. As a result, the sheet displacing member 31A is moved from the second position separated from the first lamination sheet S1 illustrated in FIG. 5A to the first position in contact with the vicinity of the trailing end of the first lamination sheet S1 illustrated in FIG. 5B. As the sheet displacing member 31A moves, the trailing end portion of the first lamination sheet S1 is displaced in a direction deviated from the vertical direction that is a conveyance direction of a subsequent sheet. Thus, even if the leading end of the second lamination sheet S2 is conveyed, contact between the two sheets S1 and S2 is avoided. As a result, the contact between the first lamination sheet S1 and the second lamination sheet S2 is avoided, and occurrence of sheet ejection jam is prevented.

In the above-described configuration, the third wall 30Ba that faces the sheet displacing member 31A is coupled to the bent portion 30C. The first storage 30A below the bent portion 30C has a narrow space. The second storage 30B above the bent portion 30C has a wide space. According to this configuration, the leading end of the sheet displacing member 31A that moves from the second position to the first position can move to the outside of the second storage 30B. The trailing end of the first lamination sheet S1 can be reliably brought close to a position where the leading end of the second lamination sheet S2 does not come into contact with the trailing end of the first lamination sheet S1. As a result, the sheet processing device 24 can be provided that can store sheets in the vertical direction in a favorable condition without causing bend with a space-saving and simple configuration.

Next, a description is given of a series of operations in the sheet processing device 24 including the operations illustrated in FIGS. 5A and 5B with reference to FIGS. 6A to 6F. The operations illustrated in FIGS. 6A and 6B are similar to the operations illustrated in FIGS. 5A and 5B, and thus descriptions thereof are omitted. After the sheet displacing member 31A is moved from the second position to the first position as illustrated in FIG. 6B, the leading end of the second lamination sheet S2 passes the trailing end of the first lamination sheet S1 as illustrated in FIG. 6C after a specified time has elapsed since the leading end of the second lamination sheet S2 is detected by the sheet leading end detection sensor 36. When the sheet leading end detection sensor 36 detects that the leading end of the second lamination sheet S2 has reliably passed the trailing end of the first lamination sheet S1 based on the signal from the sheet leading end detection sensor 36, the driver 31B is operated to move the sheet displacing member 31A from the first position to the second position as illustrated in FIG. 6D. By this operation, the trailing end of the first lamination sheet S1 is elastically deformed into a shape along the third wall 30Ba, thus preventing the leading end of the second lamination sheet S1 from coming into contact with the trailing end of the first lamination sheet S2. The above-described operation, as illustrated in FIG. 6E, can prevent the sheet from being bent, thus allowing the second lamination sheet S2 to be favorably stored in the sheet storage 30. Thereafter, as illustrated in FIG. 6F, the sheet displacing member 31A is moved from the second position to the first position, the third lamination sheet is conveyed, and the operations of FIGS. 6C to 6F are repeated. Thus, the plurality of lamination sheets S can be favorably stored in the sheet storage 30 without causing the lamination sheets S to bend.

The above-described configuration of the present embodiment can be applied to the case where the size of the sheets is such that the trailing end of the first lamination sheet S1 can be retracted by the sheet displacer 31 in a state where the leading end of the second lamination sheet S2, which is the next sheet of the first lamination sheet S1, is positioned within the range of the distance A illustrated in FIG. 6B. The conveyance of the second lamination sheet S2 by the fifth conveying roller pair 32 may be temporarily stopped in the state illustrated in FIG. 6C and resumed after the sheet displacing member 31A is moved to the second position as illustrated in FIG. 6D. If the movement of the sheet displacing member 31A is in time, the conveyance of the second lamination sheet S2 by the fifth conveying roller pair 32 may not be temporarily stopped in the state illustrated in FIG. 6C. Thus, even when the conveyance speed of the lamination sheet S is high, the occurrence of bend due to contacting between sheets can be prevented, and the sheets can be stored in the sheet storage 30 in a favorable condition. In the above-described embodiment, the sheet storage 30 has a shape extending substantially in the vertical direction. However, the sheet storage 30 may have a shape extending obliquely or in the substantially horizontal direction as long as the sheet can be stably stored in the vertical direction with a space-saving and simple configuration.

FIG. 7 is a plan view of a sheet storage 30D used in the second embodiment of the present disclosure when viewed from the upstream side in the sheet conveyance direction, and the second storage 30B is not illustrated. The sheet storage 30D is used in place of the sheet storage 30 and defines the sheet processing device 24. The sheet storage 30D is different from the sheet storage 30 only in that the sheet storage 30 includes a first wall 30Da instead of the first wall 30Aa, and other configurations are substantially the same. The first wall 30Da has a convex portion 30db formed to protrude toward the sheet conveyance passage at a central portion in the sheet width direction. The sheet displacing member 31A is disposed on a side facing the sheet conveyance passage of the convex portion 30db.

With this configuration, the lamination sheet S stored in the sheet storage 30D is moved toward the second wall 30Ab by the sheet displacing member 31A. The subsequent lamination sheet S is fed between the preceding lamination sheet S and the first wall 30Da. At this time, since the convex portion 30db is formed, the conveyance resistance acting on the subsequent lamination sheet S is reduced. An air layer 30Dc is formed between the subsequent lamination sheet S and the first wall 30Da. As a result, the lamination sheet S is prevented from sticking to the first wall 30Da, and the occurrence of sheet conveyance failure is prevented.

FIGS. 8A and 8B illustrate a sheet displacing member 31C used in a third embodiment of the present disclosure. In each of the above-described embodiments, when the sheet displacing member 31A displaces the trailing end of the lamination sheet S, the sheet displacing member 31A is driven by the driver 31B to move from the second position to the first position. When this operation is continuously performed, if the leading end of the sheet displacing member 31A repeatedly comes into contact with the third wall 30Ba, the leading end of the sheet displacing member 31A and the sheet conveyance surface of the third wall 30Ba may be scraped or damaged, so that the leading end of the conveyed lamination sheet S may be caught to cause conveyance failure. In order to prevent the occurrence of this problem, the sheet displacing member 31C is used.

The sheet displacing member 31C integrally includes a stopper 31Ca that comes into contact with a surface of the first wall 30Aa on a side opposite to the sheet conveyance surface when the sheet displacing member 31C occupies from the second position illustrated in FIG. 8A to the first position illustrated in FIG. 8B. When the sheet displacing member 31C occupies the first position, the stopper 31Ca comes into contact with the first wall 30Aa. The leading end of the sheet displacing member 31C does not come into contact with the third wall 30Ba. Such a configuration can prevent the leading end of the sheet displacing member 31A and the sheet conveyance surface of the third wall 30Ba from being scraped or damaged, and can prevent the occurrence of conveyance failure caused by the leading end of the conveyed lamination sheet S being caught. As illustrated in FIGS. 8A and 8B, a stopper 31Cb may be disposed that comes into contact with a surface of the first wall 30Aa on a side opposite to the sheet conveyance surface when the sheet displacing member 31C occupies the second position.

Further, in each of the above-described embodiments, as the sheet displacer 31, a configuration may be adopted in which a torque limiter is disposed between the sheet displacing members 31A and 31C and the driver 31B, specifically, on the shaft of the support shaft 31Aa or in the drive mechanism. With this configuration, even in a case where a plurality of lamination sheets S are conveyed into the sheet storage 30 (or 30D), the sheet trailing end portion can be reliably brought close to the third wall 30Ba without damaging the lamination sheets S. Specifically, in a case where the stored lamination sheet S is thick, when the sheet displacing members 31A and 31C move from the second position to the first position, the leading ends of the sheet displacing members 31A and 31C may come into contact with the third wall 30Ba via the lamination sheet S. At this time, a torque limiter operates and the sheet displacing members 31A and 31C idle with respect to the support shaft 31Aa. Thus, an act of external force on the lamination sheet S and the third wall 30Ba can be prevented.

Figure 9A:
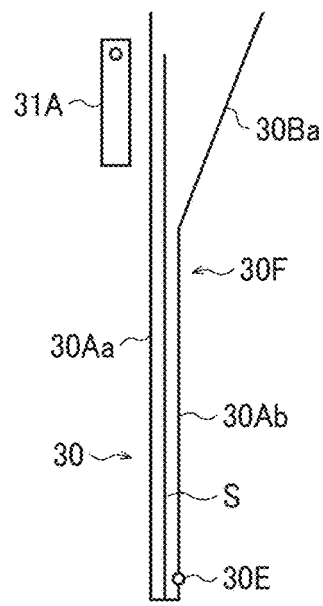
FIGS. 9A and 9B are schematic views of a sheet storage used in a sheet processing device according to an embodiment of the present disclosure.
Figure 9B:
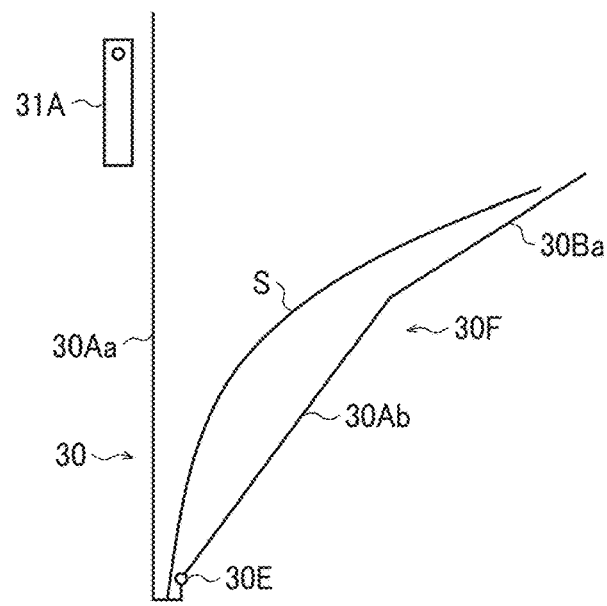

Next, a description is given of the take-out of the lamination sheet S stored in the sheet storage 30 (or 30D). The sheet storage 30 (or 30D) is likely to be formed in a narrow space as the laminator 3 is miniaturized. In the above-described embodiment, only the sheet ejected at the time of abnormality is stored in the sheet storage 30 (or 30D) and the usage frequency is low. Nonetheless, the stored sheet needs to be easily taken out. In the sheet storage 30 (or 30D) of the present disclosure, the second wall 30Ab and the third wall 30Ba, which are integrated as a single unit as illustrated in FIGS. 9A and 9B, are supported by a fulcrum 30E to be openable and closable to form an opening and closing portion 30F. An opening and closing operation of the opening and closing portion 30F is performed in a state where the plate-shaped member 28b is opened as indicated by a long dashed double-dotted line in FIG. 2. With this configuration, even in the sheet storage 30 (or 30D) that is located in a narrow place and is used less frequently, the stored sheets can be more easily taken out, thus allowing the workability of the sheet storage 30 (or 30D) to be enhanced.

In the present embodiment, the output tray 28 in which the finished-product lamination sheets SA are stored has a large amount of stacked sheets and thus has a large space. Since the number of lamination sheets that have multi-fed or have been failed in separation is small and the output tray 28 is used more frequently than the sheet storage 30 (or 30D) that stores the multi-fed or failed lamination sheets, the workability of the output tray 28 having the opening portion 28a serving as an open portion is enhanced when the stored sheets are taken out. In the above-described configuration, the finished-product lamination sheet SA for which the laminate processing is normally completed is stored in the output tray 28 having a larger sheet storage amount than the sheet storage 30 (or 30D), whereas the lamination sheet S for which the process is interrupted is stored in the sheet storage 30 (or 30D). With this configuration, the sheet storage 30 (or 30D) having a smaller space for receiving sheets than the output tray 28 has the sheet displacer 31, thus allowing the sheets to be stored in a favorable state even in the sheet storage 30 (or 30D) disposed in a narrow space.

Figure 10:
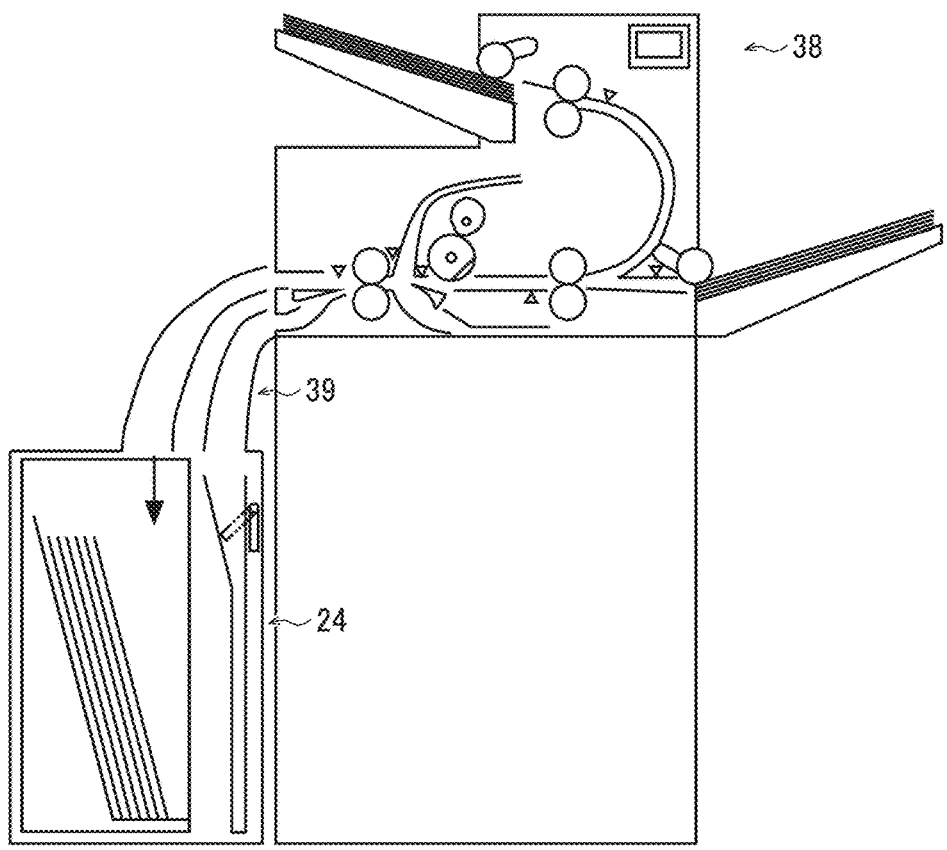
FIG. 10 is a schematic view of a laminator according to an embodiment of the present disclosure.

In each of the above-described embodiments, the sheet processing device 24 is applied to the laminator 3 that performs the laminate processing while conveying the lamination sheet S in a vertical direction. However, as illustrated in FIG. 10, the sheet processing device 24 of the present disclosure is also applicable to a laminator 38 that performs laminate processing while conveying a lamination sheet S in a horizontal direction, such as a laminator described in Japanese Patent Application Publication No. 2021-143072 or its corresponding U.S. Patent Application Publication No. 2021-0289090. In this case, the conveyance direction of the lamination sheet S ejected in the horizontal direction from the laminator 38 is changed to the vertical direction by a conveyance passage 39. As a result, the sheet processing device 24 can be provided that can store sheets in the vertical direction in a favorable state with a space-saving and simple configuration.

In the above-described embodiments, the laminator 3 (or 38) is described as an apparatus to which the present disclosure is applicable. However, the apparatus to which the present disclosure is applicable is not limited to this configuration, and the present disclosure is also applicable to an image forming apparatus such as a printer, a copying apparatus, a facsimile, or a multifunction peripheral, and a sheet conveying apparatus that conveys a sheet-shaped conveyed object. In the above-described embodiments, the lamination sheet S is used as a conveyed medium. However, the conveyed medium is not limited to the lamination sheet, and may be any sheet-shaped and elastically deformable material such as thick paper, postcard, roll paper, envelopes, plain paper, thin paper, coated paper (i.e., coat paper or art paper), tracing paper, OHP transparency, OHP film, or resin film.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure. The effects described in the embodiments of the present disclosure are examples of the most suitable effects arising from the embodiments, the effects according to embodiments of the present disclosure are not limited to the above-described effects.

The invention claimed is:

1. A sheet processing device comprising:
   a sheet storage configured to store multiple sheets conveyed in a conveyance direction, the sheet storage including a first storage portion and a second storage portion upstream from the first storage portion in the conveyance direction of the sheets, the first storage portion including:
   a fixed bottom wall;
   a first wall being one side wall of the sheet storage and extending from the fixed bottom wall; and
   a second wall being part of another side wall of the sheet storage and extending from the fixed bottom wall, and
   the second storage portion including a third wall continuous to the second wall; and
   a sheet displacer limited to a back and forth pivoting movement and configured to:
   displace a preceding sheet of the sheets that are stored in the sheet storage; and
   contact an upper end of the preceding sheet to displace the preceding sheet such that the upper end of the preceding sheet moves toward the third wall,
   wherein the sheet displacer is configured to displace the preceding sheet prior to a subsequent sheet of the sheets being conveyed toward the second storage portion,
   wherein the second wall and the third wall are coupled via a bent portion that bends in a manner such that a storage space of the second storage portion is greater than a storage space of the first storage portion, and
   wherein, after the sheet displacer has displaced the upper end of the preceding sheet, the sheet displacer is configured to contact a leading end of the subsequent sheet to guide the leading end of the subsequent sheet to a position below the upper end of the preceding sheet.

2. The sheet processing device according to claim 1, wherein the sheet displacer includes:
   a sheet displacing member configured to contact the preceding sheet to displace the preceding sheet; and
   a driver configured to selectively displace the sheet displacing member between a first position in which the sheet displacing member contacts the preceding sheet and a second position in which the sheet displacing member separates from the preceding sheet, and wherein the sheet displacing member conveys the subsequent sheet following the preceding sheet toward the second storage portion when the sheet displacing member occupies the first position, and then the driver displaces the sheet displacing member from the first position to the second position.

3. The sheet processing device according to claim 2, wherein the sheet displacing member is configured to not contact the third wall when the sheet displacing member occupies the first position.

4. The sheet processing device according to claim 1, wherein the sheet displacer includes a torque limiter.

5. The sheet processing device according to claim 1, wherein the first wall has a convex portion formed along the conveyance direction of the sheets.

6. The sheet processing device according to claim 1, wherein the sheet storage has an opening and closing portion configured to open to take out the sheets stored in the sheet storage.

7. A sheet output device comprising:
the sheet processing device according to claim 1; and
an output tray having a larger sheet storage capacity than a sheet storage capacity of the sheet storage,
wherein the sheet storage is configured to store a sheet on which a process of the sheet processing device is interrupted, and the output tray is configured to store a sheet on which the process is normally ended.

8. The sheet output device according to claim 7, wherein the output tray has an opening portion to take out the sheet stored in the output tray.

9. A laminator comprising the sheet processing device according to claim 1,
wherein the laminator is configured to laminate a two-ply sheet in which two sheets are overlaid and joined and an inner sheet inserted between the two sheets of the two-ply sheet.

10. An image forming apparatus comprising the sheet processing device according to claim 1.

11. An image forming apparatus comprising the sheet output device according to claim 7.

12. An image forming apparatus comprising the laminator according to claim 9.

13. An image forming system comprising the sheet processing device according to claim 1.

14. The sheet processing device according to claim 1,
wherein the preceding sheet is not conveyed out of the sheet storage in a direction of the upper end of the preceding sheet, and
wherein the sheet displacer is further configured to displace the upper end of the preceding sheet.

15. The sheet processing device according to claim 1,
wherein the sheet storage extends along a sheet conveyance direction of a conveying roller pair that is positioned at a downstream end in the sheet conveyance direction and is configured to convey the preceding sheet and the subsequent sheet to the sheet storage, and
wherein the sheet displacer is configured to displace the upper end of the preceding sheet in a direction transverse to the sheet conveyance direction.

* * * * *